United States Patent
Lutowsky, Jr. et al.

(10) Patent No.: US 6,701,781 B1
(45) Date of Patent: Mar. 9, 2004

(54) MASS AIR FLOW SENSOR BYPASS HOUSING

(75) Inventors: Steven Michael Lutowsky, Jr., Canton, MI (US); James Christopher Driscoll, Sterling Heights, MI (US); Edward Paul McLeskey, Waterford, MI (US); John Frank Foss, Okemos, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/718,539

(22) Filed: Nov. 22, 2000

(51) Int. Cl.⁷ .................................................. G01F 1/68
(52) U.S. Cl. .................................................. 73/204.25
(58) Field of Search .............................. 73/204.25, 204, 73/204.26, 204.21, 204.22, 204.23, 861.63, 861.61, 861.66; 364/424.013

(56) References Cited

U.S. PATENT DOCUMENTS

| | | | |
|---|---|---|---|
| 4,213,335 A | | 7/1980 | Peter et al. |
| 4,304,130 A | | 12/1981 | Peter et al. |
| 4,604,895 A | * | 8/1986 | Watkins ........................ 73/204 |
| 4,776,213 A | * | 10/1988 | Blechinger et al. ............ 73/202 |
| 5,481,925 A | * | 1/1996 | Woodbury ................ 73/861.66 |
| 5,631,417 A | * | 5/1997 | Harrington et al. ...... 73/204.26 |
| 5,796,612 A | * | 8/1998 | Palmer ................. 364/424.013 |

FOREIGN PATENT DOCUMENTS

| | | |
|---|---|---|
| DE | 3613867 A1 | 10/1987 |
| JP | 54 9968 | 1/1979 |
| JP | 04128615 A | 4/1992 |
| JP | 2000241222 A | 9/2000 |
| JP | 2000-292267 | 10/2000 |

* cited by examiner

Primary Examiner—Edward Lefkowitz
Assistant Examiner—Jewel V. Thompson
(74) Attorney, Agent, or Firm—John E. Kajander, Esq.

(57) ABSTRACT

A mass air flow sensor 10 including a housing 14, an air foil element 16, and at least one sensor element 22 mounted on the surface of the air foil element 16, whereby disruption to the air flow is minimized and performance of the mass air flow sensor 10 in lower air flows is improved.

19 Claims, 1 Drawing Sheet

MASS AIR FLOW SENSOR BYPASS HOUSING

TECHNICAL FIELD

The present invention relates generally to a mass air flow sensor and more particularly with reduced costs and improved efficiency and performance.

BACKGROUND OF THE INVENTION

Mass air flow sensors (MAFS) are commonly used in internal combustion engines to maintain an optimal air/fuel ratio. Mass air flow sensors often work on the "hot wire" principle where a constant temperature is maintained in a "hot" element which is often a positive coefficient resistor. The hot element is heated by the electrical current passing through it and is positioned in the approaching air flow or in an air flow sampling tube or "bypass". A second ambient or "cold" element is also positioned in the same fashion and is electrically in parallel with the hot element. As the air flows over the hot element, it cools the element down, effectively reducing the resistance of the elements. The lower resistance allows more current to flow in order to maintain a constant temperature difference between the hot and cold elements. This change in current results in a change in voltage which is sent to the engine computer.

Although mass air flow sensors are known in the automotive industry, existing MAFS designs can have undesirable characteristics. One known design utilizes a differential pressure bypass to produce the needed velocity increase past the hot sensor for measuring low air flows at engine idle. This design, however, can produce a significant pressure drop between the inlet and the outlet of the MAFS. This pressure drop contributes to the total dissipative losses of the air induction system, in which the MAFS is utilized, thereby reducing the efficiency of the AIS (Air Induction System) in supplying air to the engine. This can be highly undesirable.

In an attempt to reduce the magnitude of the pressure drop across the MAFS, some existing differential pressure bypass designs attempt to limit the sensor's intrusion into the approaching air flow. This, however, can generate the need for tight tolerances from mounting the MAFS within the air flow. Variation in mounting these MAFS designs can result in variability of the output and thereby negatively affect engine performance. The tight tolerances required to minimize such variations can result in undesirable cost increases to the mass air flow sensor and the air induction system.

Current MAFS designs also have the undesirable characteristic of disposing the sensor elements to the approaching air flow. This exposure of the sensing elements can increase the risk of contaminating the sensing elements due to particles in the air flow. Contamination of the sensing elements can potentially cause a shift in the output with the mass air flow sensor. It is known that shifts in the mass air flow sensor output can cause the air/fuel mixture to be too lean and result in detonation and damage to the engine.

It would, therefore, be highly desirable to have a mass air flow sensor design that reduce the pressure drop of air passing through a MAFS eliminates the need for tight tolerances and reduces the risk of contaminating the sensing elements.

SUMMARY OF THE INVENTION

It is therefore an object of the present invention to provide a mass air flow sensor with increased efficiency, reduced cost, and reduced sensitivity to contamination.

In accordance with the objects of this invention, a mass air flow sensor is provided. The mass air flow sensor includes a housing. Within the housing is positioned an air foil element. At least one sensing element is surface mounted on the air foil element.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
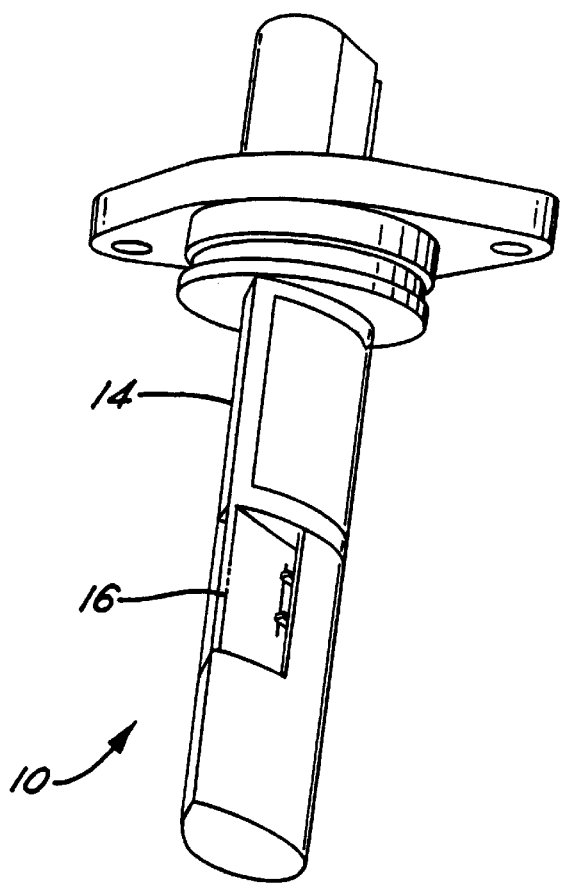
FIG. 1 is an illustration of an embodiment of a mass air flow sensor in accordance with the present invention.

Referring now to FIG. 1, which is an illustration of an embodiment of a mass air flow sensor 10 in accordance with the present invention. The mass air flow sensor 10 is preferably for use in automotive applications. However, the mass air flow sensor 10 may be used in a variety of other applications, including non-automotive applications.

Figure 2:
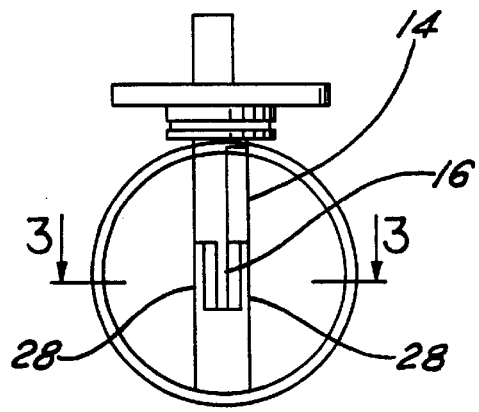
FIG. 2 is a cross-sectional illustration of a mass air flow sensor as described in FIG. 1, shown installed in an air intake tube.

Referring now to FIG. 2, which is a cross-sectional illustration of a mass air flow sensor 10 in accordance with the present invention. The mass air flow sensor 10 is shown positioned within an air intake tube 12. The mass air flow sensor 10 includes a housing 14. In one embodiment, the housing 14 is comprised of plastic, although a variety of materials may be used in its construction. Although the housing 12 can be formed in a variety of shapes, in one preferred embodiment, the housing 14 is formed generally in an air foil shape to minimize the effect on air passing through the air intake tube 12.

In addition, the mass air flow sensor 10 can span the entire intake tube to further reduce any adverse effects to the air flow past the sensing elements 22 (see FIG. 3) due to the air flow disturbances at the free end of the transverse member.

The mass air flow sensor 10 further includes an air foil element 16. In one embodiment, the air foil element 16 is formed integral with the housing 12, although in additional embodiments, the air foil element 16 may be formed separately.

Figure 3:
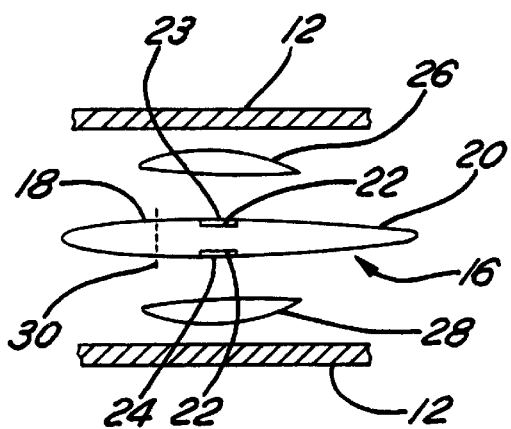
FIG. 3 is a cross-sectional illustration of mass air flow sensor as shown in FIG. 2 taken along lines 3—3 in the direction of the arrows.

Referring now to FIG. 3, which is a cross-sectional illustration of mass air flow sensor 10 as shown in FIG. 2 taken along lines 3—3 in the direction of the arrows. The air foil element 16 is shown in a general air foil shape, although a variety of air foil shapes are known in the art. In the illustrated embodiment, the air foil element 16 has a larger cross-sectional portion 18 and a smaller cross-sectional portion 20, the larger cross-sectional portion 18 is positioned upstream of the smaller cross-sectional portion 20 within the air intake tube 12. In other embodiments, however, alternate shapes and configurations are possible.

The mass air flow sensor 10 also includes at least one sensor element 22 mounted on the surface of the air foil element 16. Although a varying number of sensor elements 22 are possible, FIG. 3 illustrates one common configuration with two sensor elements 22. The sensor elements 22 are mounted on the surface of the air foil element 16. The location of the sensor elements 22 on the surface of the airfoil element 16 allows the sensor elements 16 to be exposed to the air flow with minimum disruption to the air as it passes over the sensors 16. As one example, the pressure drop that can be created by some mass air flow sensors is minimized. In addition, the air foil element 16 can accelerate the approaching air and thereby improve the dynamic range of the sensor elements 22. This can improve the ability of the sensor elements 22 to accurately measure lower air flows.

Although a variety of known types of sensor elements 22 are known in the art, one embodiment utilizes positive coefficient resistors as sensors to measure the air flow past the sensors. The resistors commonly operate based on the well known "hot wire" principle. In this configuration, an ambient resistor or ambient sensor element 24, known as the cold wire, is used to sense the ambient temperature of the air. A second resistor or hot sensor element 23, known as the hot wire, is used to sense the air flow. Both sensing elements 22 are positioned within the air flow. The hot sensor element 23 is heated by pumping current through it until its temperature reaches a specified gradient from the ambient sensor element 24. As air flow across the hot sensor element 23 increases, heat is transferred to the air at a higher rate. When this happens, the temperature of the hot sensor element 23 will begin to lower and consequently lower its resistance. When the resistance of the hot sensor element 23 starts to lower, the circuit will then raise the amount of power being dissipated by the hot sensor element 23 by pumping more current through it.

The mass air flow sensor 10 can additionally include a first air flow controller 26 and a second air flow controller 28. The first air flow controller 26 and the second air flow controller 28 are positioned on opposing sides of the air foil element 16. Although the mass air flow sensor 10 is operational without these controllers, they can be useful in controlling and increasing the speed of the flow past the sensor elements 22. This can further improve the dynamic range of the mass air flow sensor 10, and thereby further improve its performance in low air flow conditions. Although the controllers may be formed in a variety of shapes, one preferred embodiment forms them in air foil shapes to reduce their resistance and improve their performance. As with the air foil element 16, the first air flow controller 26 and the second air flow controller 28 can be formed separately. In alternate embodiments they may be formed as an integral piece of the housing. Although the first air flow controller 26 and the second air flow controller 28 have been described, it should be understood that the mass air flow sensor 10 can be practiced with a varying number of air flow controllers or no air flow controllers at all.

Figure 4:
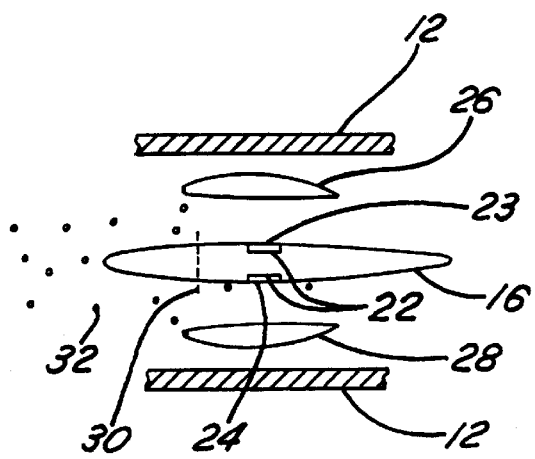
FIG. 4 is an additional illustration of the mass air flow sensor as shown in FIG. 3.

Referring now to FIG. 4, which is a cross-sectional illustration of mass air flow sensor 10 as shown in FIG. 2 taken along lines 4—4 in the direction of the arrows. Although the sensor elements 22 can be mounted on any portion of the surface of the air foil element 16, in one embodiment the sensor elements 22 are positioned downstream of the apex 30 of the air foil element 16. By positioning the sensor elements 22 downstream of the apex 30, contaminants 32 within the air stream are less likely to collect on the sensing elements 22, and the reduction in performance of the sensing elements 22 due to contaminants 32 is minimized.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A mass air flow sensor comprising:
   an air foil element;
   a housing in communication with said air foil element; and
   at least one sensor element, said sensor element mounted flush on the outer surface of said air foil element.

2. A mass air flow sensor as described in claim 1 wherein said sensor element is a positive coefficient resistor.

3. A mass air flow sensor as described in claim 1 wherein said at least one sensor element is mounted downstream of the apex of said air foil element.

4. A mass air flow sensor as described in claim 1 wherein said air foil element contains a larger cross-sectional portion and a smaller cross-sectional portion, said larger cross-sectional portion being positioned upstream of said smaller cross-sectional portion.

5. A mass air flow sensor as described in claim 1 wherein said air foil element is positioned in the approximate center of an air intake tube.

6. A mass air flow sensor as described in claim 1 wherein that at least one sensor element comprises two sensor elements, said two sensor elements operating under the hot wire principle.

7. A mass air flow sensor as described in claim 1 wherein said housing spans the entire diameter of an air intake tube.

8. A mass air flow sensor comprising:
   an air foil element;
   a housing in communication with said air foil element;
   at least one sensor element, said sensor element mounted on or adjacent to the surface of said air foil element;
   a first air flow controller; and
   a second air flow controller, said first air flow controller and said second air flow controller positioned on opposing sides of said air foil element, said first air flow controller and said second air flow controller controlling the flow of air past said air foil element.

9. A mass air flow sensor as described in claim 8 wherein said first air flow controller and said second air flow controller are air foils.

10. A mass air flow sensor as described in claim 8 wherein said air foil element, said first air flow controller, and said second air flow controller are formed as part of said housing.

11. A mass air flow sensor comprising:
    an air foil element;
    a housing in communication with said air foil element;
    at least one sensor element positioned flush on the outer surface of said air foil element;
    a first air flow controller; and
    a second air flow controller, said first air flow controller and said second air flow controller positioned on opposing sides of said air foil element, said first ail flow controller and said second air flow controller controlling the flow past said air foil element, said second air flow controller and said first air flow controller comprising air foils.

12. A mass air flow sensor as described in claim 11 wherein said sensor element is a positive coefficient resistor.

13. A mass air flow sensor as described in claim 11 wherein said at least one sensor element is mounted downstream of the apex of said air foil element.

14. A mass air flow sensor as described in claim 11 wherein said air foil element contains a larger cross-sectional portion and a smaller cross-sectional portion, said larger cross-sectional portion being positioned upstream of said smaller cross-sectional portion.

15. A mass air flow sensor as described in claim 11 wherein said air foil element, said first air flow controller, and said second air flow controller are formed as part of said housing.

16. A mass air flow sensor as described in claim 11 wherein said air foil element is positioned in the approximate center of an air intake tube.

17. A mass air flow sensor as described in claim 11 wherein that at least one sensor element comprises two sensor elements, said two sensor elements operating under the hot wire principle.

18. A method of measuring air flow comprising:

passing air over at least one sensor element, mounted on an air foil element positioned within the air flow;

registering an electrical signal from said at least one sensor element;

correlating said electrical signal to a measurement of air flow; and directing the air flow past said air foil element through the use of a first ail flow controller and a second air flow controller, said first air flow controller and said second air flow controller positioned on opposing sides of said air foil element, said second air flow controller and said first air flow controller comprising air foils.

19. A method of measuring air flow as described in claim 18, wherein said passing air over at least one sensor element comprises:

passing air over at least one positive coefficient resistor.

* * * * *